Nov. 4, 1969  B. E. HARTMANN  3,477,019
RUPTURE STRIP FOR INDICATING EARTH MOVEMENT
Filed July 21, 1967  2 Sheets-Sheet 1
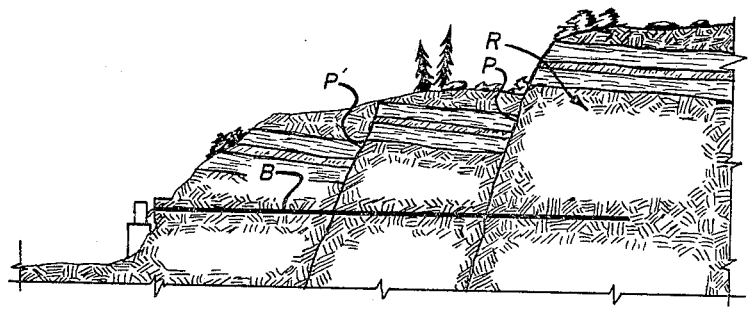
FIG. 1
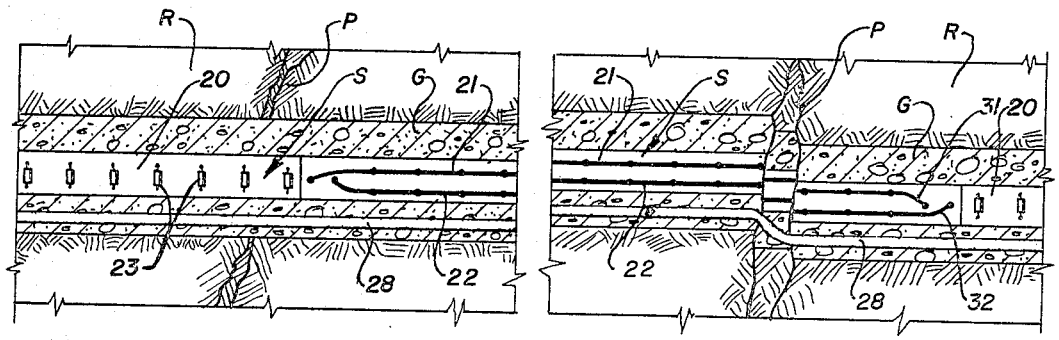
FIG. 2  FIG. 3
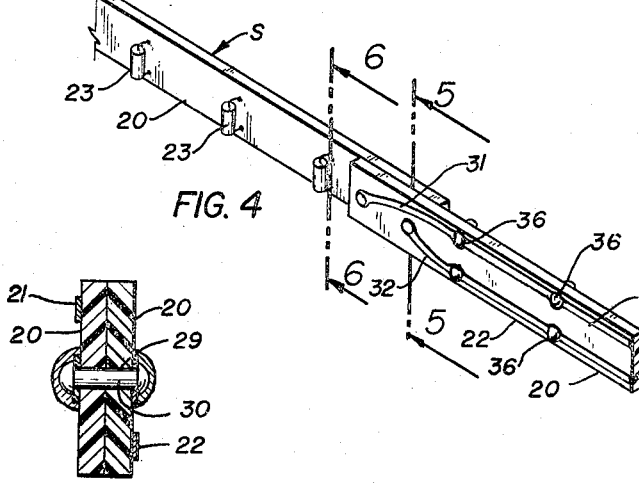
FIG. 4  FIG. 6
FIG. 5
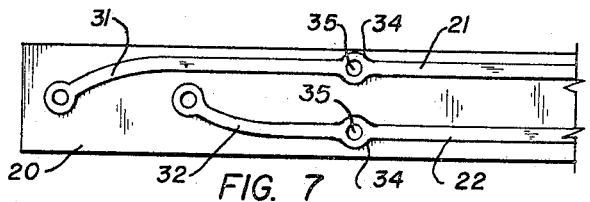
FIG. 7
INVENTOR.
Bert E. Hartmann
BY Van Valkenburgh & Lowe
ATTORNEYS INVENTOR.
Bert E. Hartmann
BY
ATTORNEYS

United States Patent Office 3,477,019
Patented Nov. 4, 1969

3,477,019
RUPTURE STRIP FOR INDICATING EARTH MOVEMENT
Bert E. Hartmann, Golden, Colo., assignor to Teledyne Industries Inc., Los Angeles, Calif., a corporation of California
Filed July 21, 1967, Ser. No. 660,858
Int. Cl. G01r 31/08
U.S. Cl. 324—52        12 Claims

ABSTRACT OF THE DISCLOSURE

A rupture strip adapted to be embedded, as by grout, in a borehole extending into a rock formation. The strip is of frangible, brittle material to rupture responsive to movement within the formation. Electrical conductors, in parallel, are printed on this strip and a uniformly spaced array of resistors shunt the conductors in parallel. In operation, the rupture of the strip at a given location breaks the conductors at that location, and ohmmeter readings at either end of the strip will thus indicate the location of the rupture.

---

This invention relates to means and apparatus for noting occurrence of disturbances in rock and earth formations and more particularly, to apparatus to indicate the occurrence of movement in an earth or rock formation, as along a slip plane or in a shear zone. More specifically, the invention concerns apparatus for indicating the occurrence of a rock movement within a formation by rupture of the apparatus at the point of the occurrence of the movement, and as such, the invention will be hereinafter referred to as a rupture strip for indicating earth movement.

In many engineering projects, it is important to know of the occurrence of rock movement within a formation, as in situations where the formation is adjacent to blasting activities, or the formation is at the side of an excavation or the formation will constitute an abutment or foundation base for a structure to be built thereon. To provide such indications and measurements of rock movement, several different types of instruments have been developed, such as extensometers and lateral deformation indicators. These instruments are ordinarily mounted into a borehole drilled into the formation and they can detect and measure small movements and changes in the length and the alignment of the borehole, and such changes occur responsive to movements in the rock formation. Such instruments will provide a continuous record of movement, but they are comparatively elaborate, expensive and require careful installation and reading. Often, the only essential engineering information is to ascertain whether or not a movement will occur and the location of such movement within the formation.

The present invention was conceived and developed with such a need in view and comprises, in essence, a strip of frangible material which may be inserted and grouted in a borehole as a unitary member. Such a strip will rupture responsive to any rock movement within the formation which will break or deform the grout. The rupture strip is provided with a simple, electrical circuit to permit any break of the strip to be located by read-out instruments, as will be hereinafter further described.

Accordingly, a primary object of the invention is to provide a rupture strip which may be implanted into an earth or rock formation so that it will break whenever movement occurs within the formation, as along a slip plane.

Another object of the invention is to provide a novel and improved rupture strip for indicating earth movement which ascertains the location of any movement within the formation sufficient to break the strip and permits the location and determination of slip planes within the formation which cannot be ascertained from surface indications.

Another object of the invention is to provide a rupture strip which may be embedded into an earth or rock formation to observe any movement of rock within the formation and which is capable of indicating nearly instantaneous reactions, such as the result of blasting, or, on the other hand, capable of indicating the stability of a formation as where movement may not occur for many years.

Another object of the invention is to provide a rupture strip for indicating earth and rock movement where such movements occur as a rapid sequence of events, such as the breaking up of a rock formation by blasting, such indications being possible by the use of an oscillograph.

Another object of the invention is to provide in a rupture strip adapted to be mounted in a borehole for indicating an earth movement, an electrical circuit associated therewith which can locate a break in the strip which is more nearly adjacent to the mouth of the borehole, and at the same time locate another break in the strip which is more nearly adjacent to the bottom of the borehole, to obtain thereby an indication of the longitudinal extent of movements along the reach of the borehole.

Further objects of the invention are to provide in a rupture strip for indicating earth movement, a simple, low-cost, reliable structure which is easily transported to the site of use as components suitable for handling, and which are easily assembled and installed and set up for the actual use.

With the foregoing and other objects in view, my present invention comprises certain constructions, combinations and arrangements of parts and elements as hereinafter described, defined in the appended claims, and illustrated in preferred embodiment by the accompanying drawing in which:

FIGURE 1 is a diagrammatic section of a rock formation having indicated slip planes and illustrating further, a borehole extending into the structure and traversing the slip planes to contain the improved rupture strip.

FIGURE 2 is a sectional view of a portion of the borehole illustrated at FIG. 1, but on a greatly enlarged scale to illustrate the manner in which the rupture strip is installed therein, and illustrating further, a slip plane in the rock structure intersecting the borehole.

FIGURE 3 is a longitudinal, sectional view similar to FIG. 2, but of another portion of the borehole, and showing the manner in which the strip is broken by movement of the rock structure along a slip plane.

FIGURE 4 is an isometric view of interconnected portions of a preferred form of the improved rupture strip.

FIGURE 5 is a transverse sectional view as from the indicated line 5—5 at FIG. 4, but on an enlarged scale.

FIGURE 6 is an isometric view or fragment of a strip, as taken from the indicated line 6—6 at FIG. 4, but on an enlarged scale.

FIGURE 7 is a fragmentary plan view of one end of a printed circuit board prepared for use as a component part of a rupture strip constructed according to the principles of the invention.

Figure 8:
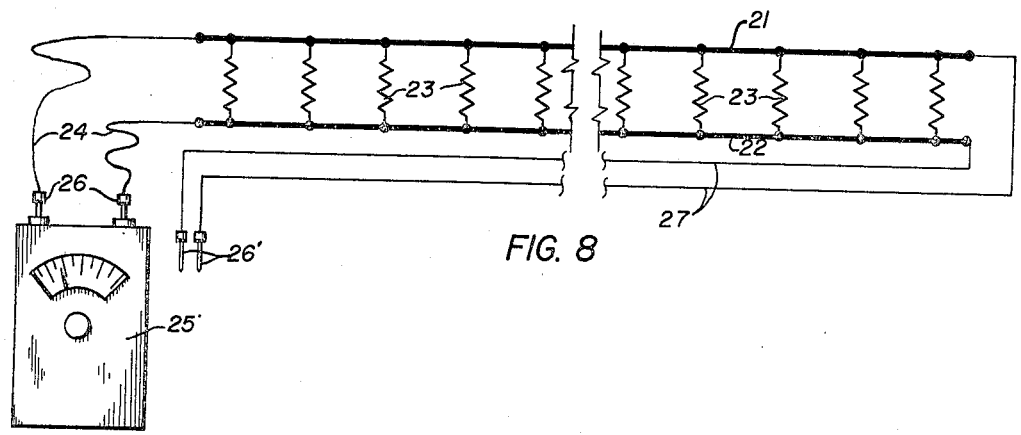
FIGURE 8 is a circuit diagram for the rupture strip.

Referring more particularly to the drawing, FIG. 1 illustrates, diagrammatically, a natural rock formation R, which is representative of one environment wherein the present invention, a rupture strip S, may be used to indicate an internal movement of the formation when such occurs. Such movement may be triggered by a number of causes, such as an explosion or the weight of a structure built thereon, or by an adjacent excavation. Such movement will usually be along an existing or inherent slip plane, thus the formation may have a slip plane exposed as at P or may also have other slip planes, such as P' which are not visible at the surface of the formation.

The invention contemplates the drilling of a borehole B into the formation to a selected depth and the improved rupture strip S is extended into and embedded in this borehole in supporting material such as grout G, as in the manner shown at FIG. 2. The borehole may also be suitably finished at its mouth by a simple structure to protect the electrical leads associated with the rupture strip S and to provide a platform or the like for read-out instruments used in connection therewith, as will be described.

The rupture strip S, illustrated at FIGS. 4 to 7, is formed as a series of flat bars 20 interconnected in tandem to extend to any desired reach depending upon the depth of the borehole into the formation. Each bar 20 is formed as a conveniently sized unit such as, for example with a length of 36 inches, a thickness of ⅛ inch and a width of 1 inch. While it is to be understood that the rupture strip S may also be a continuous member, the use of individual bars of a selected length which may be interconnected as when the unit is being installed, permit the unit to be handled and installed in a manner much easier than would be otherwise possible.

The rupture strip S, whether interconnected bars or a single strip, is necessarily formed of strong, but frangible, brittle material so that any movement of a rock formation across the borehole which is sufficient to break the grout G in the borehole wherein the rupture strip is embedded, will also break the strip S, as in the manner clearly illustrated at FIG. 3. This strip must also be of a dielectric or insulating material to carry circuits, as will be described. It was found that material the same as the substrate sheet of a printed circuit board was ideal for the purpose. This is especially true when a cheaper grade of printed circuit board is used, since such boards are made of comparatively brittle types of thermosetting synthetic resins. Any comparatively brittle, frangible, synthetic resin material, and even glass, can be used to prepare such rupture strips providing the circuits can be carried by such materials, as in the manner hereinafter described.

The purpose of an electrical circuit associated with the rupture strip is to provide a means to indicate the location of the break of the rupture strip whenever it is broken by a movement of the formation wherein the strip is embedded. Since the electrical circuits must be broken with the breaking of the rupture strip to indicate such a location, it is essential that the circuits must be intimately associated with the strip, they cannot be permitted to bend without breaking, and cannot be merely wires attached to the strip which could stretch to a considerable extent. This is accomplished in the preferred embodiment of the invention by the use of printed circuits on the strip S, preferably of the type of printed circuit which is formed by etching a copper deposit on the surface of the strip 20. Such printed circuits are formed by well-known processes and accordingly, need not be further described herein. It is to be noted that a printed circuit or an etched circuit is exemplary of a circuit on a substrate which will break with the breaking of the substrate board. In the present instance, the strip S of the invention constitutes the substrate.

One preferred, basic circuit for locating a break is illustrated at FIG. 8. Two parallel primary conductors 21 and 22 are carried on the strip and extend the length of the strip S in parallel. A sequence of resistors 23 is disposed in parallel between these conductors for purposes hereinafter described. One end of each conductor, 21 and 22, is at or adjacent to the mouth of the borehole B and the other end is adjacent to the bottom of the borehole. The ends of the conductors adjacent to the mouth of the borehole are extended by leads 24 to a readout ohmmeter 25, and these leads 24 are conveniently connected to the ohmmeter as by connector jacks 26. The ends of the conductors 21 and 22, adjacent to the bottom of the borehole, may also be connected to leads 27 which are extended to the mouth of the borehole and include jacks 26' for connection with the readout ohmmeter 25. The leads 27 are to obtain an indication of the inward extent of a break in the strip S and accordingly, the wires forming leads 27 must extend through the borehole, and they are preferably insulated with thick insulation and even encased within a comparatively thick-walled resilient tube 28. This arrangement will permit the wires of the leads 27 to yield and stretch to a considerable extent without breaking whenever moderate movements of the rock formation R occur, as in the manner illustrated at FIG. 3. Naturally, an excess movement of the rock along a slip plane will break the leads 27, but where a movement of such magnitude, several inches or more, does occur the very rupture of the leads will provide significant information.

Each bar 20, of the arrangement above described, is formed as an elongated substrate of a printed circuit board with the primary conductors 21 and 22 being etched thereon as parallel longitudinal ribbons with each ribbon being near an edge of the bar 20. The individual bars 20 are connected together to form the rupture strip S by lapping the ends of adjacent bars. To effect this lap and to provide continuity of the primary conductors, the end portion of each bar includes a pair of holes 29 centered at the longitudinal axis of the bar at a selected spacing so as to register with the corresponding holes 29 of the next-in-line bar when the ends of the bars are lapped together. So registered, the bars can be rigidly interconnected by rivets 30 which extend through the holes 29 as in the manner illustrated at FIGS. 4 and 5.

When so connected, the bars are preferably rotated with respect to each other so that the ribbon-like conductors 21 and 22 are outwardly of the lapped end portion on each bar. Each conductor 21 and 22 having its normal course adjacent to an edge of the bar, is turned inwardly to the center of the bar as it inturns 31 and 32 respectively, so each will terminate at a hole 29. It is contemplated that the rivets 30 will be of copper or similar material which will not only squeeze and lock the lapping portions together, but will also provide good electrical contacts to the terminal portions 31 and 32 of the conductors 21 and 22. Furthermore, if desired, these rivets may be capped with solder, as illustrated at FIG. 5, to perfect the electrical contact.

The resistors 23 are preferably small cylindrical units having axial wire leads 33 extending from each end. These resistors 23 are mounted at regular spacings along the reach of each bar 20 at specified intervals, such as six inches. To effect the mounting of the resistors, each printed circuit ribbon conductor 21 and 22 is provided with an enlargement 34 at each resistor location, and a hole 35 is extended through the substrate centered in each enlargement. Each ribbon circuit has such enlargements and holes in spaced opposition with the other, and accordingly, the lead wires 35 of each resistor are merely turned from their axial positions to extend through the holes 35 from the side of the bar 20 opposite to the ribbons 21 and 22, crimped against the respective ribbons and soldered in position as by drops of solder 36, as in the manner clearly illustrated in FIG. 6.

The circuit thus described comprises a plurality of bars 20 connected together as a continuous strip having the primary conductors 21 and 22 extending along the bars 20 in parallel and having spaced resistors 23 between the primary conductors. When finished and ready for installation, the conductors and all exposed leads may be insulated as with an enamel coating or the like sprayed onto the strip. By selection of resistors, with each having the same resistance, it is possible to quickly determine the total resistance of the system by connecting an ohmmeter with the lead 24 or 27 at either end of the strip. Should a break in the strip occur which will sever the primary conductors 21 and 22, the resulting increase in resistance in each portion of the system at each side of the break can be measured by the ohmmeter 25. This change in the resistance of the system will then permit an immediate determination of the number of resistors at each side of the break and the actual location of the point of the break can then be found. Should a break occur which is at a single point, such as that indicated at FIG. 7, the location of the break can be indicated by ascertaining the resistance of the system at either side thereof. If, however, the nature of the disruption of the formation is more complex, and several breaks occur at the same time, the measurements with leads 24 at the outer end of the strip will indicate the location of the outward extent of the disruption, and measurements of the leads 27 at the inner end of the strip will indicate the location of the inward extent of the disruption.

Figures 9, 10:
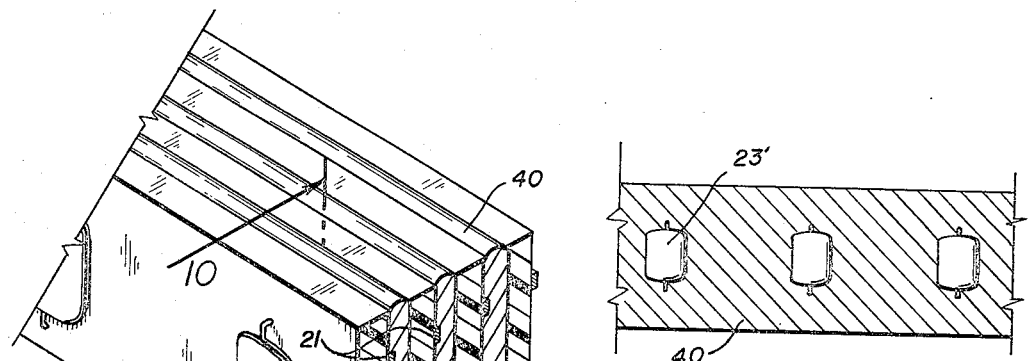
FIGURE 9 is a fragmentary, isometric view of a small portion of a modified embodiment of the invention illustrating a plurality of rupture strips sandwiched together.
FIGURE 10 is a fragmentary, sectional view as taken from an indicated line 10—10 at FIG. 9.

The simple rupture strip S, as illustrated in FIGS. 4 through 7, may be modified to provide various constructions to register more complex phenomenon. FIGURES 9 and 10 illustrate a plurality of shear strips S1, S2, S3 and S4 which are sandwiched together with plastic substances such as asphalt layers 40 between each strip to space the strips a short distance apart. Each shear strip is formed substantially as that heretofore described, having parallel ribbons 21 and 22, resistors 23' and leads 24 and 25. However, in the interest of conserving space, such resistors 23' are preferably flat, thin strip type members which are also easily available.

It is contemplated that the comparative brittleness of these strips S1, S2, S3 and S4 can be varied from a very brittle strip to one which is comparatively flexible. For example, in many resin materials suitable for forming printed circuit substrates, the synthetic material combines a resin and a plasticizer wherein the brittleness or flexibility of the final product will depend upon the comparative amounts of resin and plasticizer blended together. This is well known in the art, and suffice to say, the variation of frangibility of these strips will permit breaking to occur under varying degrees of deflection such as, for example, the strip S1 may be formulated of very brittle material which will break with a minute deflection, while the strip S4 may be a comparatively elastic material which will not break until an excessive degree of deflection occurs.

Figure 11:
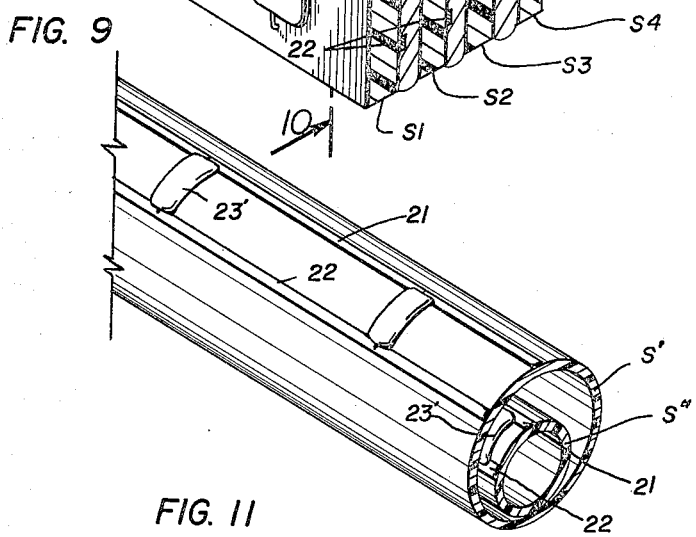
FIGURE 11 is a longitudinal, isometric view of another embodiment of the invention which incorporates loosely telescoped tubular members, each being an individual rupture strip with the inner strip requiring a substantially greater amount of rock movement to break it than that which is required to break the outer strip.

The construction shown at FIG. 11 exemplifies another modification of the invention wherein a rupture strip S' is formed as an extended tubular member. The primary conductors 21 and 22 extend along this tubular member with resistors 23' spaced regularly between them in a manner substantially the same as that heretofore described, although it is to be noted that the resistors will be placed at the same side of the tube as the conductor for the sake of convenience. In addition, a second tubular rupture strip S", having a diameter substantially less than that of the first mentioned strip, is loosely telescoped within the first so that the system comprises an outer tubular shear strip S' and an inner tubular shear strip S". When this arrangement is inserted and grouted within a borehole, the outer shear strip S' is grouted in position and will rupture responsive to any movement of the rock formation wherein it is placed which is sufficient to break the grout. Therefore, this outer rupture strip S' can be made to indicate a very slight movement of the formation.

At the same time, however, because of the loose fit of the inner rupture strip S" within the outer, it will not rupture until a substantial deflection of the formation occurs, which is sufficient for the opposite sides of the outer rupture strip to move together and shear or crush the inner strip S".

The use of spaced resistors 23 is an example of preferred elements in an electrical circuit which indicates the location of a rupture within the system in a very quick, simple manner. However, it is to be noted that other analogous circuits may be used to indicate the breaking of a rupture strip S providing that the primary conductors extending into the borehole are subject to severance whenever the rupture strip breaks. In some applications where the electrical environment is suitable, it is even contemplated that a single, wide primary conductor can be used and that an indication of the location of break could be obtained by measurement of the comparative changes of capacities in this strip before and after the occurrence of a break or rupture.

I have now described my invention in considerable detail. However, it is obvious that others skilled in the art can build and devise alternate and equivalent constructions which are nevertheless within the spirit and scope of my invention. Hence, I desire that my protection be limited not by the constructions illustrated and described, but only by the proper scope of the appended claims.

I claim:

1. An elongated rupture strip of selected length for embedment interiorly of a formation subject to internal movement at an unknown location along the reach of the strip with one end of the strip being disposed at an access point at the outer surface of the formation and comprising:

(a) a longitudinally extended, frangible, substrate strip of said selected length and rupturable at the location of a movement within a formation wherein the strip is embedded;

(b) a pair of conductors affixed to said strip to extend along the reach of the strip in spaced parallelism and being severable responsive to the rupture of said substrate strip;

(c) an array of resistors mounted on the strip at selected spacings along the reach of the strip with each resistor interconnecting the aforesaid conductors;

(d) supporting material within said formation and surrounding said substrate, said frangible substrate being embedded in said material and said conductors being accessible only at the end of said strip at said access point at the outer surface of the formation;

(e) a readout ohmmeter connecting the ends of the conductors at said access point, adapted to measure the aggregate resistance of all of the resistors between the conductors and to, thereafter, indicate the occurrence of a rupture of the strip responsive to internal movement of the formation and permit the location of the rupture to be computed by measuring the changed resistance between the conductors.

2. The rupture strip defined in claim 1, wherein said conductors are printed circuits.

3. The rupture strip defined in claim 1, wherein:
said conductors are printed circuits; said strip member constitutes a plurality of substrate sections interconnected in tandem by overlapping the adjacent ends of each section and wherein the ends of the sections are interconnected by a pair of rivets through the lapping end portions and each conductor of each section extends to a rivet thereby providing continuity from a conductor on one section to a conductor on the adjacent section.

4. A plurality of rupture strips as defined in claim 1, wherein said strips are sandwiched together and wherein the strips are of varying degrees of brittleness.

5. A pair of rupture strips as defined in claim 1, wherein each strip is a tubular member, with one strip being substantially larger in diameter than the other, and wherein the smaller strip loosely telescopes in the first.

6. In the rupture strip defined in claim 1, a pair of leads connecting the aforesaid strip conductors at the end of the strip opposite said access point, said leads being of sufficient length to be extended along said reach to said access point and a protective sheath adapted to receive said leads and embedded within said material from the interior end of the strip to the access point at the opposite end thereof.

7. Apparatus for indicating the occurrence and location of movement interiorly of a formation along a selected reach through the formation, commencing at an access point at an outer surface of the formation, and comprising in combination:
  (a) an elongated, longitudinally extended, frangible, substrate strip having a length sufficient to extend over said reach;
  (b) supporting material within said formation surrounding and embedding said strip along said reach, commencing at said access point, whereby said strip is rupturable responsive to and at the location of a movement within said formation;
  (c) longitudinal conductor means affixed to and extended over the length of said substrate strip and being severable responsive to the rupture of the substrate strip, said conductor means having an accessible end at the outer surface of the formation; and
  (d) electrical measurement means connected to said accessible end of the conductor means adapted to measure the electrical characteristics of the conductor means within the formation and to subsequently indicate the occurrence and location of a movement interiorly of the formation sufficient to rupture the substrate strip by measuring the change of the electrical characteristics of the conductor means responsive to a severance of the conductor means.

8. In the combination set forth in claim 7, wherein said reach comprises:
  a borehole trough the formation wherein said strip is placed; and
  said material embedding said strip includes a grout filling the borehole.

9. In the combination defined in claim 7, wherein:
  said conductor means comprises a pair of conductors affixed to the strip to extend along the reach of the strip in parallelism and an array of resistors mounted on the strip at selected, spaced intervals along the reach of the strip; and
  said electrical measurement means comprises a readout ohmmeter connecting the ends of the conductor at said access point adapted to measure the resistance between the conductor means.

10. A method for indicating the occurrence of and establishing the location of a movement interiorly of a formation along a selected reach through the formation commencing at an access point at the outer surface of the formation, including the steps of:
  (a) establishing said reach through the formation;
  (b) embedding within a supporting material introduced interiorly of said formation along said reach a longitudinally extended, frangible, substrate strip having a longitudinally extended conductor means affixed to said strip and being severable responsive to a rupture of the substrate strip;
  (c) measuring the electrical characteristics of the conductor means at the access point, at the surface of the formation; and thereafter, after movement of the formation has occurred sufficient to rupture the substrate strip and sever a portion of the conductor means,
  (d) measuring the changed electrical characteristics of the conductor means at said access point to permit a computation of location of the movement of the formation.

11. In the method defined in claim 10, wherein said reach is established by drilling a borehole into the formation and wherein said substrate strip is embedded along said reach by filling the borehole with grout.

12. In the method defined in claim 10, wherein said substrate strip conductor means includes:
  a pair of conductors affixed to said strip to extend along the reach of the strip in parallelism and an array of resistors on the strip at selected spacings along the reach of the strip with each resistor interconnecting the conductors; and
  wherein the measurement of the electrical characteristics of the conductor means at the access point includes the step of measuring the aggregate resistance of all the resistors between the conductors, and the measurement of the electrical characteristics of the conductor means after the movement of the formation has occurred, including the step of measuring the aggregate resistance of the resistors connecting the conductors between the access point and the point of rupture of the substrate.

References Cited
UNITED STATES PATENTS

| | | | |
|---|---|---|---|
| 2,692,924 | 10/1954 | Williams et al. | 340—421 XR |
| 2,958,065 | 10/1960 | Flanagan | 324—51 XR |
| 3,072,500 | 1/1963 | Berlinghof | 200—61.08 XR |
| 3,111,655 | 11/1963 | Kotarsky et al. | 61—45 XR |
| 3,149,266 | 9/1964 | Lipton | 174—68.5 XR |
| 3,230,327 | 1/1966 | McDowell | 200—61.08 |
| 3,260,810 | 7/1966 | Alston et al. | 200—61.08 |
| 3,340,607 | 9/1967 | Shutt | 117—212 XR |
| 3,359,488 | 12/1967 | Park | 324—55 |
| 3,367,175 | 2/1968 | Morreal et al. | 340—421 XR |

GERARD R. STRECKER, Primary Examiner

U.S. Cl. X.R.

61—45; 200—61.08; 340—256, 421